Sept. 18, 1962 P. BILLEN ET AL 3,054,283
TUBE-TESTING MACHINE FOR THE SIMULTANEOUS
TESTING OF A PLURALITY OF TUBES
Filed Jan. 21, 1958 10 Sheets-Sheet 2

INVENTORS
P. Billen
W. Dicks
J. Legros
By Glaser & Downing Teebole
ATTYS.

INVENTORS
P. Billen
W. Dicks
J. Legros

INVENTORS
P. Billen
W. Dicks
J. Legros
BY
ATTYS.

INVENTORS
P. Billen
W. Dicks
J. Legros

United States Patent Office 3,054,283
Patented Sept. 18, 1962

3,054,283
TUBE-TESTING MACHINE FOR THE SIMULTANEOUS TESTING OF A PLURALITY OF TUBES
Peter Billen, Leverkusen-Kuppersteg, Walter Dicks, Krefeld-Urdingen, and Josef Legros, Dusseldorf-Oberkassel, Germany, assignors to Schloemann Aktiengesellschaft, Dusseldorf, Germany
Filed Jan. 21, 1958, Ser. No. 710,258
Claims priority, application Germany Feb. 21, 1957
11 Claims. (Cl. 73—49.5)

This invention relates to a machine for testing the fluidtightness of tubes by forcing liquid into them under pressure. The machine comprises a transverse conveying device, which takes up tubes on one side of the machine, carries them each between two testing heads, and, after the completion of the testing, ejects them towards the other side of the machine. The invention consists in the feature that an endless transverse conveyor, consisting for instance of rotatable conveyor discs provided with tube-receiving notches or catches, which can be driven stepwise, brings a number of tubes simultaneously, each between two testing heads the axes of which cannot be displaced in a lateral direction, in such a way that the several tubes are tested at the same time. Since the testing heads therefore do not travel transversely to the axis of the machine, the hydraulic pressure pipes leading to them are easy to seal in a fluidtight manner. Moreover the number of testing heads may remain limited to the number of tubes that are to be simultaneously pressed. The number of testing heads therefore remains much smaller than in tube-testing machines that have revolving testing heads.

In order to guide the tubes reliably to the testing heads, a feeder device preceding the transverse conveyor, for instance a screw conveyor, introduces the tubes to be tested, flush with one another at one end of the machine with the aid of a guiding rib, and each between two testing heads, one of which is mounted on an axially displaceable testing carriage and the other on a fixed frame-supporting member. During this operation the longitudinally displaceable testing-head carriage is displaceable always through a constant amount, for instance by means of a toggle-lever gear, and the testing heads of the stationary frame member, each individually in automatic adaptation to unequal tube lengths, are longitudinally displaceable independently of one another, preferably by hydraulic means, until the tubes are clamped.

For the accurate delivery of the tubes each between two testing heads, it is advantageous, according to a further feature of the invention, that the transverse conveyor, which has rotatable conveyor discs known in themselves with notches for the accommodation of the tubes, is equipped with discs allocated to one another in pairs, one of which has stationary notches while the other has rockable holding claws for holding the tubes, and that the discs of one pair are angularly adjustable relatively to one another for the purpose of adaptation to tubes of different thicknesses.

For the exact adjustment of the tubes to the testing heads there also pertains the exact maintenance of the holding positions of the conveyor discs. According to a further feature of the invention, the conveyor discs are for this reason progressively rotated by way of a pawl gear by means of a reciprocating toothed rack by equal amounts every time. For the exact maintenance of the end positions the displaceable rack preferably carries an abutment, which at the end of the rotation, with the rack, passes within reach of an abutment revolving with the disc shaft, so that the position of the disc at the end of the rotary movement is precisely fixed.

To facilitate the adaptation to tubes of unequal length, the testing heads of the fixed frame member are mounted on hydraulically actuated longitudinally bored pistons, the rear ends of which extend out through the heads of the associated cylinders, and are each guided as a sword tube through a second cylinder, out of which the filling water for the tube is supplied to the piston bore. For supplying the pressure water, a separate sword tube is provided. By the expression "sword-tube," in this specification, is meant a tube which is slidable to a limited extent through fluidtight packings at both ends of a cylinder, the interior of the sword-tube being in open communication with the interior of the cylinder in all positions of the sword-tube through a transverse bore in the latter.

Other advantageous features of the invention will be gathered from the following description of a constructional example, illustrated in the accompanying drawings, in which:

FIGURES 2, 3, 4, 5 and 6 are each divided between two sheets, the parts being marked 2a, 2b etc.

Figure 10:
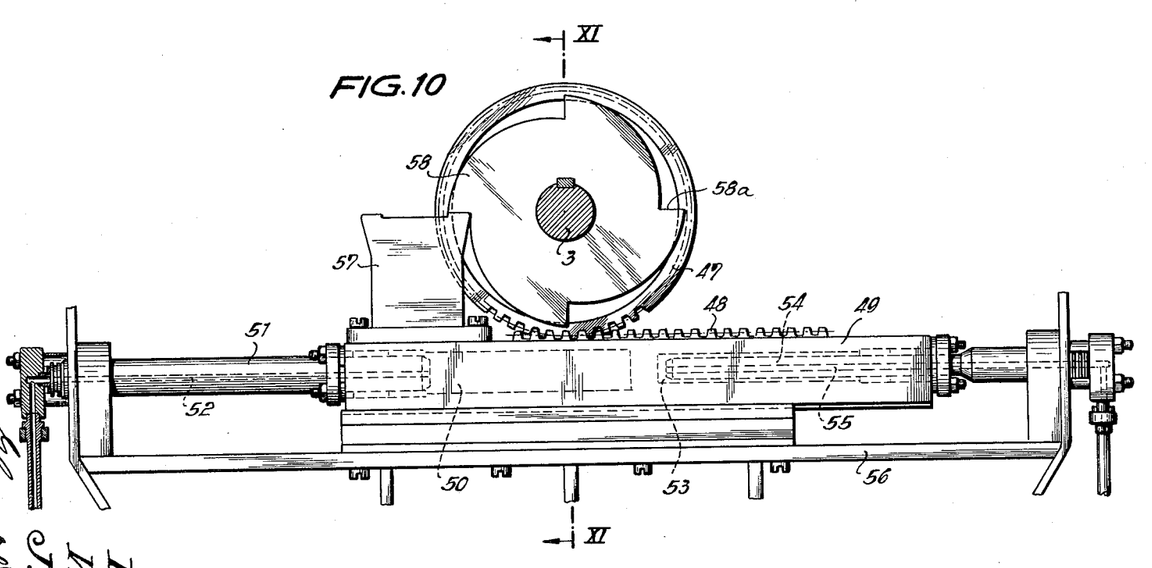
FIGURE 10 a view, looking in the direction of the line X—X in FIGURE 2, on a larger scale of the means for rotating the transverse conveyor.
Figure 11:
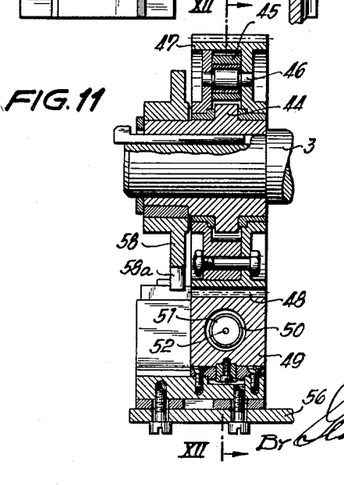
FIGURE 11 a section on the line XI—XI in FIGURE 10.
Figure 12:
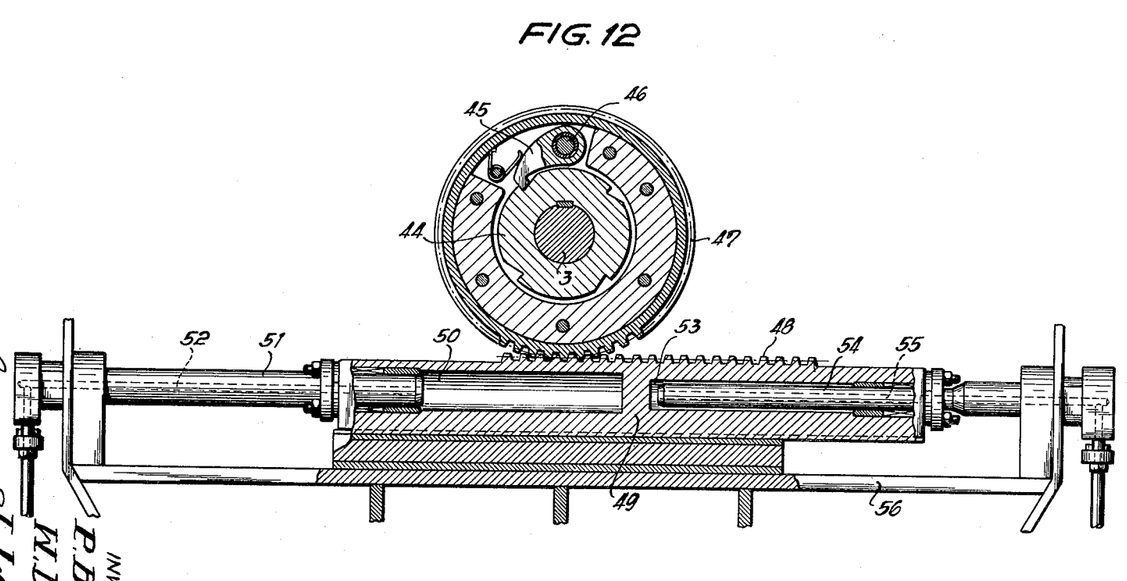
FIGURE 12 a section on the line XII—XII in FIGURE 11.
Figure 13:
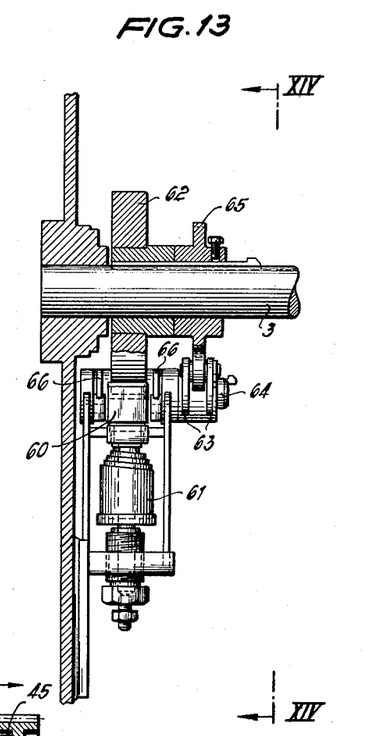
FIGURE 13 a section through a brake acting upon the shaft of the transverse conveyor.
Figure 14:
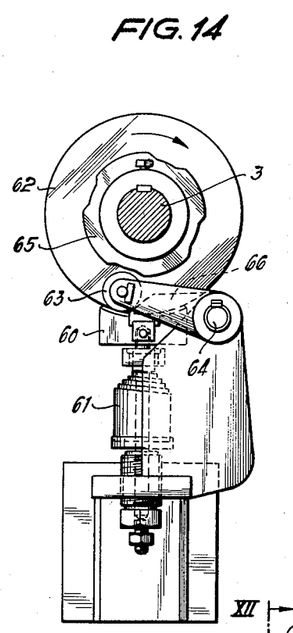
FIGURE 14 a view on the line XIV—XIV in FIGURE 13.

On rails 1, by means of wheels 2, the carriage 2a carrying the transverse conveying means is displaceable, and by means not shown is clampable. This transverse conveying means has a longitudinal shaft 3, upon which are mounted pairs of discs 4 and 5, which, by means of appropriate receivers 25 (FIGURES 7 and 9), each lift one of the tubes 6 to be tested from an inclined runway 7, and advance it through a definite distance. The tubes 6 pass on to the runway 7 with the aid of screw conveyors 8, which lift the tubes 6a, and at the same time push them with one end against a guiding plate 9, so that the tubes lie flush with one another at this end. At this end a stationary supporting frame member 10 is mounted, which is attached to tie-rods 11, on which is indirectly supported a testing-head carriage 12 displaceable in the longitudinal direction; for this testing-head carriage 12 is connected by way of two pairs of toggle levers 13 with a frame 14, which is likewise displaceable upon the rails 1, but can be fixed in various positions by means of plug-bolts 15. The pairs of toggle levers 13 can be straightened or bent at an angle by a lifting magnet 16, and then displace the testing-head carriage 12 forwards or backwards through a definite distance each time. The shaft 3, which carries the discs 4 and 5, is rotatable through 90° each time by the driving means, which is illustrated in FIGURES 10 to 12. With specific operative procedures, the shaft 3, with the discs 4 and 5, can be held by a brake 17, which is illustrated in FIGURES 13 and 14. On the stationary frame support 10 are mounted a number of testing-head carriers 18a, with the testing heads 18, which can each be displaced forwards and backwards individually in relation to the frame support 10, and which serve at the same time for supplying the filling water and the pressure water. A testing-head carrier 18a with the corresponding control and movement appliances is represented on a larger scale in FIGURE 15. The machine according to the example of construction illustrated is designed to test five tubes at once each time, and accordingly has five testing-head carriers 18a, which are arranged on an arc of a circle.

The testing-head carriage 12 carries five testing heads 19, which are not longitudinally displaceable in relation to the testing-head carriage.

Figure 1:
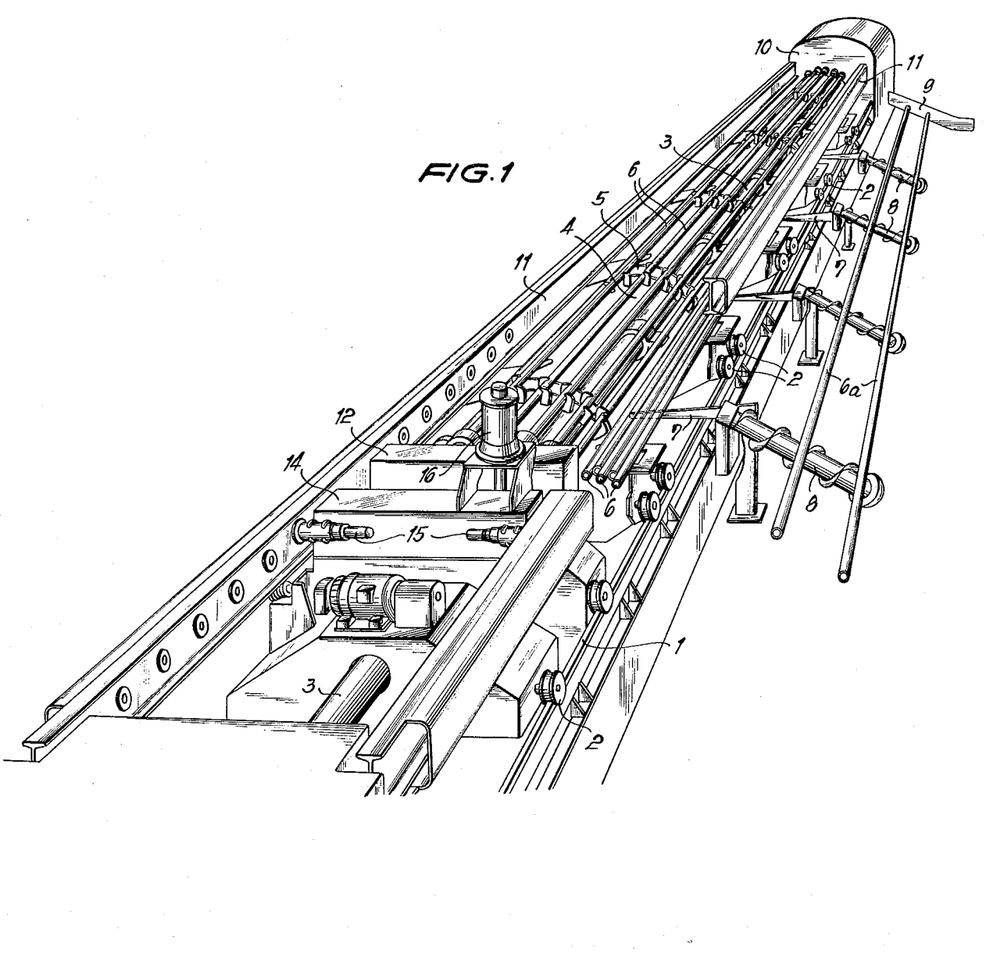
FIGURE 1 shows in perspective a general view of a tube-testing machine according to the invention.
Figure 2A:
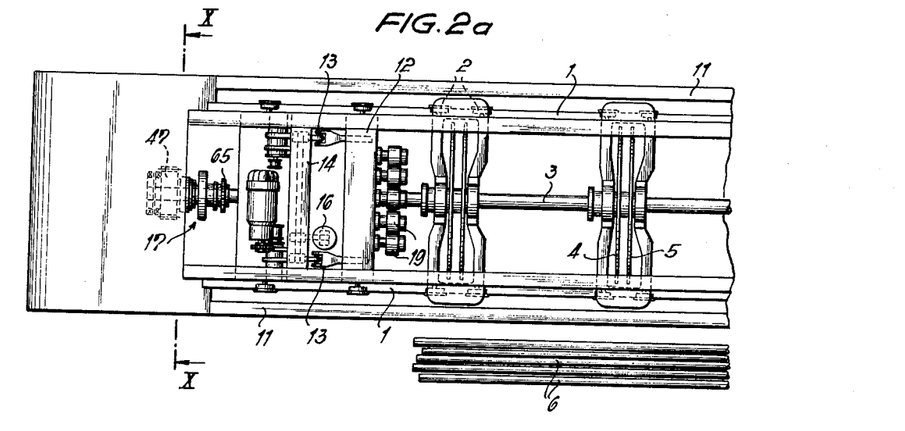
FIGURE 2 a plan view of the same machine.
Figure 2B:
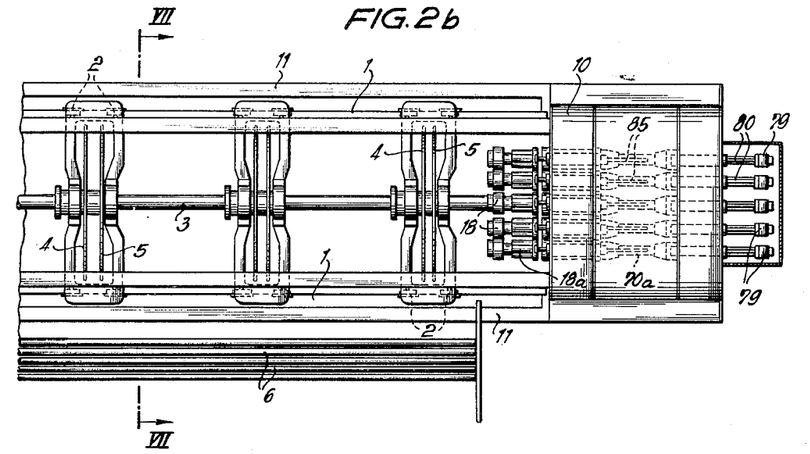
Figure 3A:
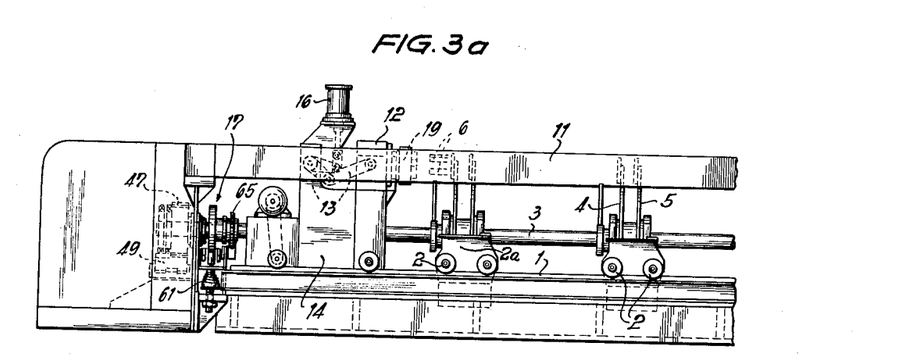
FIGURE 3 an associated side view.
Figure 3B:
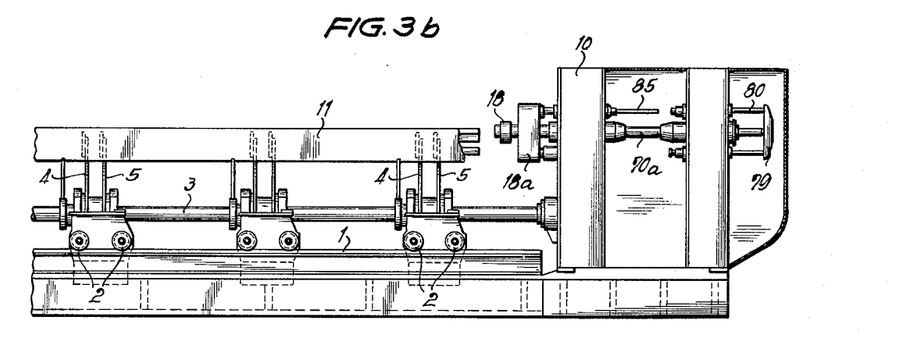
Figure 4A:
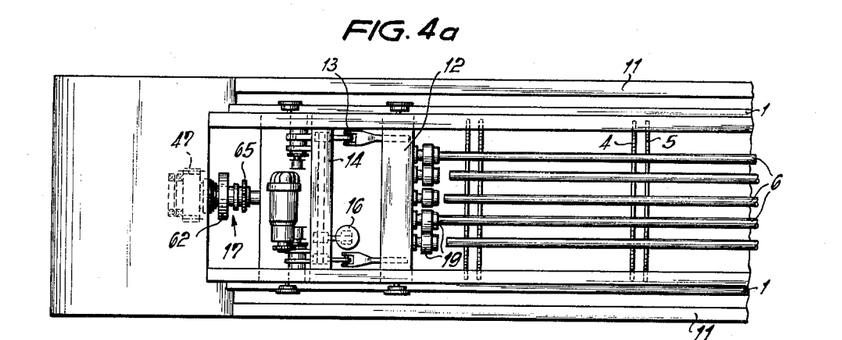
FIGURES 4 to 6 the same plan view as FIGURE 2 but in other operative positions.
Figure 4B:
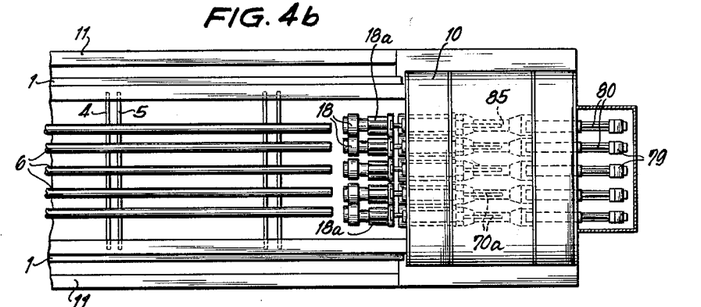
Figure 5A:
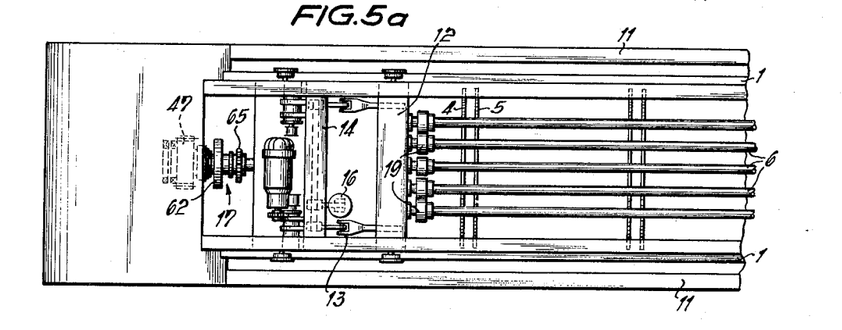
Figure 5B:
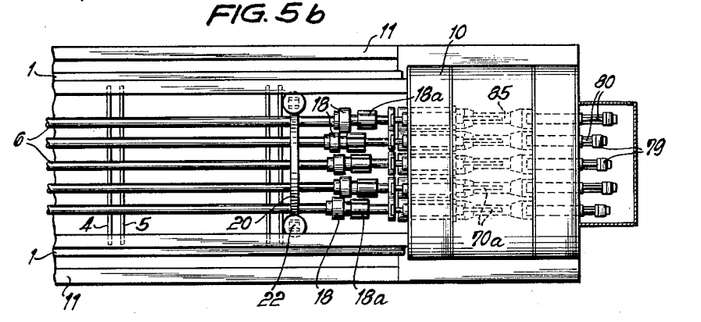
Figure 6A:
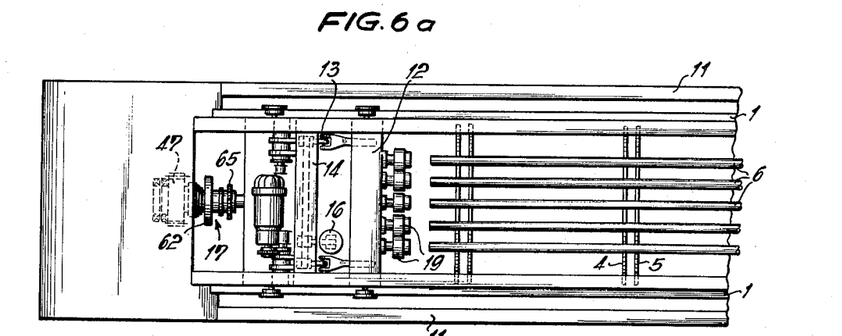
Figure 6B:
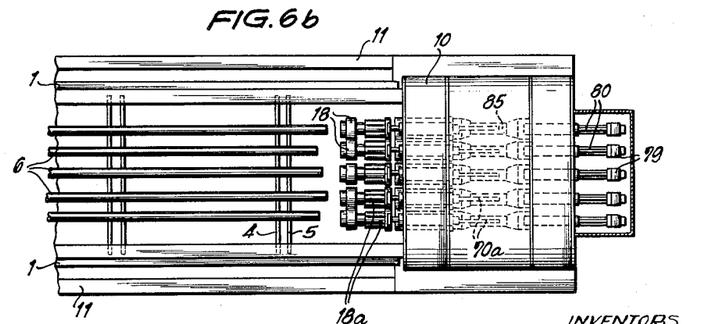
Figure 16:
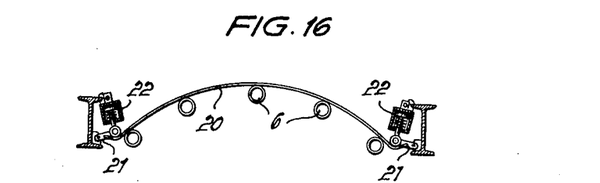
FIGURES 16 and 17 a clamping band, in two different positions, for holding the tubes during a definite operative condition.
Figure 17:
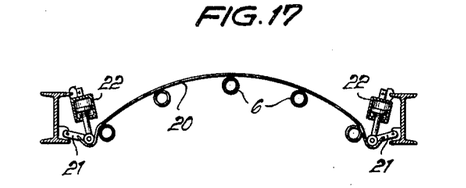

Considered on broad lines, the testing machine works as follows: The tubes 6, which lie flush with one another at their right-hand ends (FIGURE 2b), are fed one after the other to the receivers 25 of the transport discs. Thus, as FIGURE 2b shows, they are of different lengths at the left-hand end. When the five tubes 6 are brought each between two testing heads 18 and 19, first the testing-head carriage 12 is displaced by actuating the magnet 16, as FIGURE 4a shows, for instance through a distance of 100 millimetres. Under these circumstances only the longest tubes come into contact with a testing head 19. Thereupon filling water is given to the right-hand testing-head carriers 18a (FIGURE 4b), so that these are displaced, and pass into the position shown in FIGURE 5b. Now the tubes can be filled with pressure liquid and thus tested. After this the testing heads 18 are automatically drawn back, compare FIGURE 6b, while the testing heads 19 are moved back by the backward movement of the testing-head carriage 12. During the backward movement of the testing heads the tubes are held by a clamping band 20, which is shown in FIGURES 5b, 16 and 17, but for the sake of simplicity is omitted from the other figures. Each end of the clamping band is mounted on a lever 21, which in each case is pivoted to one of the tie-rods 11. The levers 21 can be rocked by cylinders and pistons 22, in which case they pass from the position shown in FIGURE 16 into the clamping position of FIGURE 17. This clamping of the tubes is effected shortly before the retraction of the testing heads 18 and 19, when the latter pass over out of the position of FIGURES 5a and 5b into the position of FIGURES 6a and 6b. Next the band 20 is released again, so that with the rotation that now starts of the shaft 3 through 90° the tubes can be advanced without hindrance. In the course of this rotation they are thrown off by the discs 4 and 5, whereby the testing operation is terminated.

Figures 7, 8:
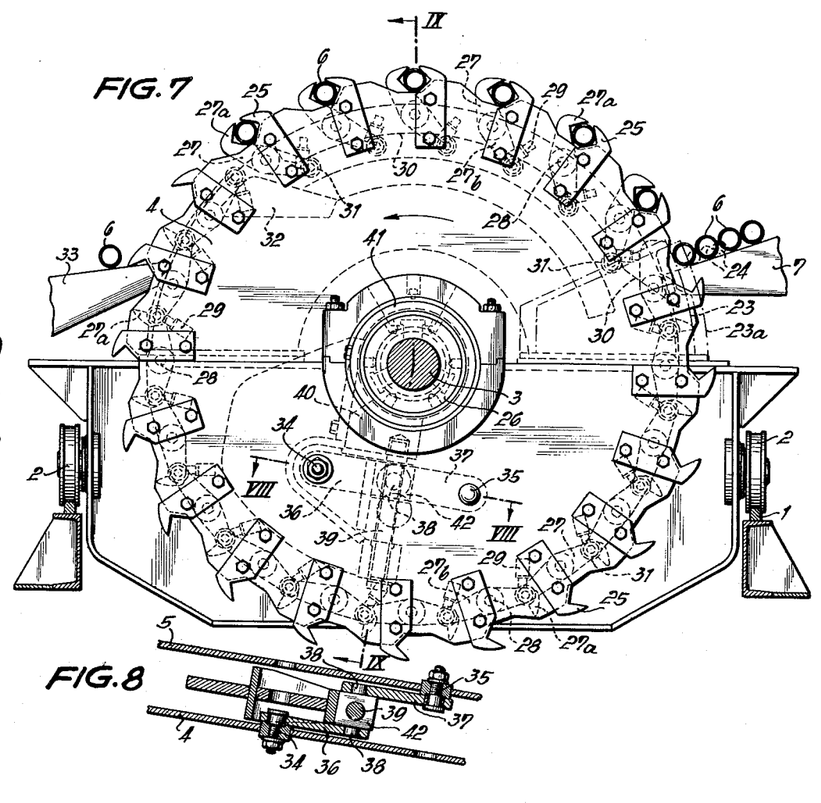
FIGURE 7 shows a cross section through the machine on about the line VII—VII in FIGURE 2.
FIGURE 8 a section on the line VIII—VIII in FIGURE 7.
Figure 9:
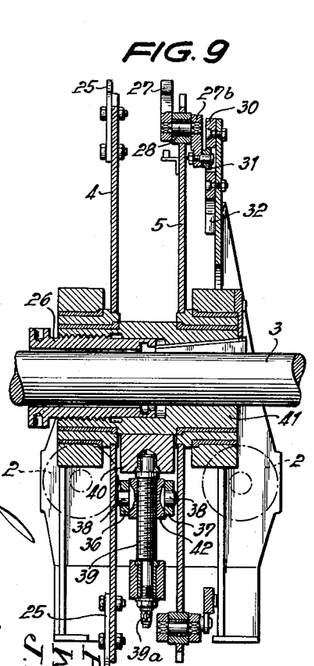
FIGURE 9 a section on the line IX—IX in FIGURE 7.

FIGURES 7 to 9 show the transverse conveying means. The tubes 6 roll down a runway 7 to an abutment plate 23, which is adjustable. If tubes 24 of smaller diameter are to be tested, the abutment plate 23 is shifted into the position 23a. This is done in order that the stationary notches or catches 25 on the disc 4 may always engage only a single tube. The catches 25 are mounted fast on the disc 4. This is keyed by means of a clamping nut 26, together with the disc 5, to the shaft 3. The disc 5 carries holding claws 27, which are rockable about pins 28. The hook-like end 27a of each holding claw 27, in conjunction with an associated stationary catch 25, is able to hold a tube. The holding claw is urged into the open position by a permanent magnet 29, which is mounted fast on the disc 5. The rocking of the holding claw into the closed position is effected by a cam disc 30, upon which a cam roller 31 runs, which is mounted on a lever 27b, which is keyed to the pivot 28 of the holding claw 27. The closing of the holding claw is effected directly after the catches 25 have taken up a tube. The upper five tubes (compare FIGURE 7) are tested simultaneously. After the testing has been completed the discs 4 and 5 are turned through 90°, the cam rollers 31 being pushed back by the guideway 32, so that the holding claws open fully and come into contact with the permanent magnets allocated to them. On the left-hand side of FIGURE 7 an already tested tube 6 is thrown out on to a runway 33.

In order that the catches 25 and holding claws 27 may be adaptable to tubes of different diameters, the discs 4 and 5 are angularly rotatable relatively to each other. In order that they may always bring the tubes exactly in front of the testing heads, the relative angular adjustment is so provided that one disc, when the other is turned through a definite amount to the right relatively to the shaft 3, will be turned to the left through the same amount relatively to this shaft. This is rendered possible by the device that is illustrated particularly in FIGURE 8. The two discs 4 and 5 carry a bolt each, 34 and 35. To each of these bolts is pivoted a tension bar, 36 or 37. The free ends of these tension bars are pivoted to pins 38, which are mounted on a nut 42, which is arranged upon a rotatable spindle 39. This spindle is rotatable in a spindle socket 40, which is mounted on the chuck 41, which in its turn is non-rotatably keyed fast to the shaft 3. The spindle 39 can be rotated by fitting a spanner upon the end 39a, the nut 42 being moved radially towards or away from the shaft 3. During this operation the bars 36 and 37 are rocked, whereby a relative rotation of the two discs 4 and 5 in relation to the shaft 3 is effected.

The rotation from time to time of the shaft 3 through 90° is effected by means of a ratchet-and-pawl gear, which is illustrated in FIGURES 10 to 12. Upon the shaft 3 is keyed fast a ratchet wheel 44, in the notches of which a pawl 45 can engage, the pivot 46 of which is supported in a toothed wheel 47. The toothed wheel 47, therefore, in a counter-clockwise rotation, takes with it the ratchet wheel 44, with the shaft 3, whereas in a clockwise rotation of the toothed wheel 47 no rotation of the shaft 3 is effected. The toothed wheel 47 is in mesh with a toothed rack 48, which is mounted upon a cylinder body 49. A stationary piston 51 extends into one cylinder 50 in this body, and through a bore 52 in this piston liquid under pressure can be passed into the cylinder 50. A stationary piston 54 extends into the other cylinder 53, into which pressure liquid can likewise be passed through a bore 55. The cylinder body 49 is longitudinally displaceable upon a track 56, and carries, as FIGURE 10 shows, an abutment 57. Upon the shaft 3 is mounted an abutment wheel or ratchet wheel 58 with four abutments or ratchet teeth 58a. The abutment 57 of the cylinder body 49 is so arranged in relation to the abutments 58a of the abutment wheel 58 that the two abutments encounter one another when the cylinder body 49 has terminated its movement towards the right (FIGURE 10). This ensures that the shaft 3 turns through exactly 90° every time, so that the tubes carried by it have the correct position in relation to the testing heads 18 and 19.

Upon the return of the cylinder body 49, which is effected by admitting pressure liquid into the cylinder 53, the shaft 3 must not be accidentally rotated backwards. In order to prevent this a brake shown in FIGURES 13 and 14 is employed. The brake shoe 60 is pressed by a spring 61 against a brake disc 62, which is keyed to the shaft 3. The brake shoe 60 is released by a brake-lifting lever 63, which is keyed to a shaft 64. The release is effected by a cam disc 65, which is keyed to the shaft 3, rocking the lever 63 in a counter-clockwise direction (FIGURE 14), so that the lever 66, likewise mounted upon the shaft 64, then pushes down the brake shoe 60.

The shaft 3 is thereby braked, while the cylinder body 49 glides back towards the left (FIGURE 12). The lifting of the brake is effected preferably at the beginning of the forward movement of the ratchet gear.

Figure 15:
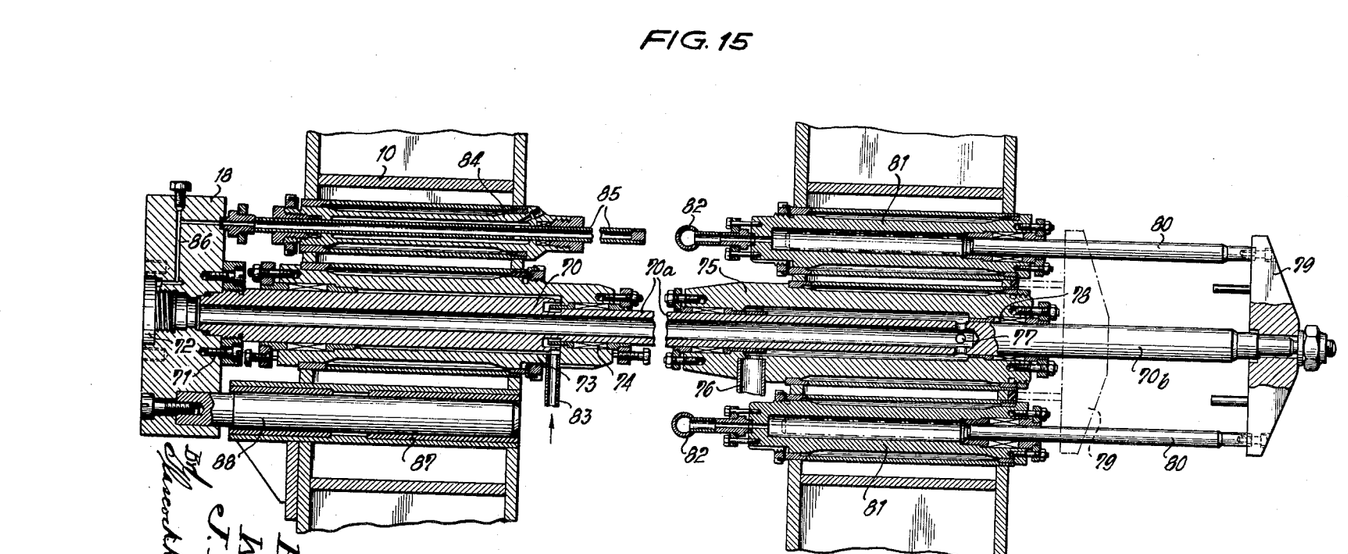
FIGURE 15 a longitudinal section on a larger scale through one of the testing heads of the fixed frame member, with the means for displacing the testing head relatively to the frame member.

The testing heads 18 arranged on the testing-head frame support 10 are each mounted in a testing-head carrier 18a (FIGURES 2b to 6b), which is itself mounted upon a longitudinally bored piston 70, and is secured there by means of screws 71, as shown in FIGURE 15. The testing heads 18 are inserted at 72. A cylinder 73 containing the piston 70 is open at its rear end, and allows the rear end 70a of the piston 70 to extend out through its aperture, which is provided with a packing 74. This end 70a is constructed as a sword-tube, and slides in a cylinder 75, into which a pressure-water supply pipe 76 opens. The sword-tube 70a is provided in the usual way with bores 77. Its rear end 70b passes right through the cylinder 75, and is sealed in relation to the rear end of the cylinder 75 by means of a packing 78. The rear end 70b of the sword-tube carries a cross-head 79, which in its turn is connected with two retracting pistons 80, which slide in cylinders 81. By 82 are denoted the inlet pipes to the cylinders 81. An inlet pipe to the cylinder 73 is denoted by 83. Parallel to the cylinder 73 is provided a cylinder 84, through which a sword-tube 85 passes. The cylinder 84 and the sword-tube 85 serve for supplying water under pressure through a duct 86 in he testing head carrier 18a, if testing heads are inserted at 72 with peripheral packing. In a cylinder 87 is arranged a slide-bolt 88, which serves for the parallel guidance of the testing-head carrier 18a.

The machine operates in the following manner: Tubes 6a are continuously delivered on to the worm-conveyor rollers 8. These tubes are pressed through frictional contact with the rotating cylindrical bodies of the screw conveyors 8 against the guiding plate 9, and brought upwards on to the runway 7 into a position in front of the discs 4 and 5. The tube ends pressed against the plate 9 are then flush with one another.

By admitting liquid under pressure into the cylinder 49 the toothed rack 48 is moved to the right, see FIGURE 12. The conveyor discs 4 and 5 are thus rotated by way of the ratchet-and-pawl device 44, 45 and the shaft 3. The discs shown have twenty catches 25 equally spaced round the circumference, and are rotated through a quarter of a revolution each time. The catches 25 (FIG. 7) of the discs therefore take up in succession five tubes 6 lying upon the runway 7. In the further movement the tubes are clamped on to the catches 25 by the holding claws 27 on the basis of the cam path 30.

As soon as the conveyor discs 4 and 5 have executed a quarter of a revolution, the abutment 57 (FIG. 10) cooperates with the abutment 58a driven by the hydraulic device 49, to ensure stoppage at the correct point. Then the cylinder 49 with the toothed rack 48 returns into the initial position again, leaving the tubes lying between the testing heads 18 and 19, there being five testing heads 18 and five testing heads 19 in the embodiment illustrated. During this operation the testing heads 19, owing to the buckling of the toggle levers 13, and the testing heads 18, owing to the retraction of the sword tubes from the ends of the inserted tubes 6, are spaced away by the distance requisite for the free movement of the tubes.

After the stoppage of the rotation of the conveyor discs 4, 5, the toggle levers 13 push the testing-head carriage 12 against the ends of the tubes, the testing heads 19 bearing against one end of the tubes. The sword tubes are now provided with pressure fluid, the testing heads 18 bearing against the other ends of the tubes in such a way that the tubes are firmly clamped between the testing heads 18 and 19. The testing of the fluidtightness of the tubes is now effected by injecting pressure fluid into them. After this the sword tubes, and with them the test heads 18, are retracted, the toggle levers 13 being at the same time buckled, and therefore the testing-head carriage 12, with the testing heads 19, runs back.

Now begins a fresh cycle of operations, wherein the tested tubes roll out of the catches 25 of the conveyor discs 4 and 5, over the runway 33, since the holding claws 27, owing to the action of the magnets 29 after the cam rollers 31 have run off from the cam disc 30, have liberated the tubes.

We claim:

1. A tube testing machine comprising a stationary supporting frame, longitudinally extending tie rods and longitudinally extending rails carried by said supporting frame and secured at one of their ends thereto, a testing head carriage adapted to travel along said rails, a longitudinally displaceable frame, means for adjustably securing said longitudinally displaceable frame to said tie rods to enable such frame to resist axial forces, means for longitudinally displacing and holding said testing head carriage relatively to said longitudinally displaceable frame, a plurality of testing heads mounted at one end of said stationary supporting frame for displacement only in the longitudinal direction of the machine, an equal plurality of testing heads mounted on the testing head carriage in alignment with said first mentioned testing heads so as to enabel tubes to be tested to be engaged in a fluid tight manner each between one testing head on the stationary supporting frame and the aligned testing head on the testing head carriage, means for admitting fluid under pressure to all the tubes so engaged via the testing heads of the stationary supporting frame, the means for longitudinally displacing and holding the testing head carriage relatively to the longitudinally displaceable frame including toggle lever means engaging at one end said carriage and at the other end said longitudinally displaceable frame, electro-magnet means operably coupled with said toggle lever means for controlling the straightening and buckling thereof, the testing heads on the stationary frame and the testing heads on the testing-head carriage being respectively arranged side by side and equally spaced apart along an arc of a circle, and the machine further comprising a mechanical feeding device consisting of pairs of conveyor discs, means for rotating the conveyor discs stepwise, catches on the discs for engaging the tubes, and said catches being spaced apart the same distance as the testing heads.

2. A tube-testing machine as claimed in claim 1, in which the means for rotating the conveyor discs comprises: a shaft on which said conveyor discs are fixedly mounted, a ratchet wheel co-axially secured to said shaft, a pawl adapted to engage said ratchet wheel, a toothed wheel carrying said pawl, a toothed rack meshing with said toothed wheel, and hydraulically actuated cylinder-and-piston means for reciprocating said rack.

3. A tube-testing machine as claimed in claim 2, and further comprising an abutment carried by said rack, a group of abutments carried by the shaft on which the conveyor discs are mounted, and said last-mentioned abutments being adapted to engage said abutment on said rack, thereby stopping the rotation of said shaft at the moment when the catches on said discs are in alignment with said testing heads.

4. A tube-testing machine as claimed in claim 3, and further comprising a brake acting upon said shaft so as to prevent accidental reversal of the direction of rotation of said shaft, means for automatically applying said brake before the beginning of the return stroke of said toothed rack, and means for automatically releasing said brake after the end of the return stroke, at the beginning of the forward stroke.

5. A tube-testing machine as claimed in claim 4, and the means for automatically applying and releasing said brake including a cam disc mounted fast on the shaft on which the conveyor discs are mounted.

6. A tube-testing machine as claimed in claim 4, and further comprising a holding band disposed adjacent a pair of conveyor discs and extending transversely over and adapted to make holding contact with a group of tubes that are actually being tested, and hydraulic means for tightening said band on to such tubes during the retraction of said testing heads so as to prevent longitudinal displacement of said tubes.

7. A tube testing machine comprising a stationary supporting frame, longitudinally extending tie rods and longitudinally extending rails carried by said supporting frame and secured at one of their ends thereto, a testing head carriage adapted to travel along said rails, a longitudinally displaceable frame, means for adjustably securing said longitudinally displaceable frame to said tie rods to enable such frame to resist axial forces, means for longitudinally displacing and holding said testing head carriage relatively to said longitudinally displaceable frame, a plurality of testing heads mounted at one end of said stationary supporting frame for displacement only in the longitudinal direction of the machine, an equal plurality of testing heads mounted on the testing head carriage in alignment with said first mentioned testing heads so as to enable tubes to be tested to be engaged in a fluid tight manner each between one testing head on the stationary supporting frame and the aligned testing head on the testing head carriage, means for admitting fluid under pressure to all the tubes so engaged via the testing heads of the stationary supporting frame, the means for longitudinally displacing and holding the testing head carriage relatively to the longitudinally displaceable frame including toggle lever means engaging at one end said carriage and at the other end said longitudinally displaceable frame, electro-magnet means operably coupled with said toggle lever means for controlling the straightening and buckling thereof, further comprising: a guiding plate fixed to the stationary supporting frame near the testing heads mounted thereon, and extending in the transverse direction of the machine, and rotating screw conveyors for raising the tubes and feeding them to the machine and simultaneously urging them endways towards the guiding plate.

8. A tube testing machine comprising a stationary supporting frame, longitudinally extending tie rods and longitudinally extending rails carried by said supporting frame and secured at one of their ends thereto, a testing head carriage adapted to travel along said rails, a longitudinally displaceable frame, means for adjustably securing said longitudinally displaceable frame to said tie rods to enable such frame to resist axial forces, means for longitudinally displacing and holding said testing head carriage relatively to said longitudinally displaceable frame, a plurality of testing heads mounted at one end of said stationary supporting frame for displacement only in the longitudinal direction of the machine, an equal plurality of testing heads mounted on the testing head carriage in alignment with said first mentioned testing heads so as to enable tubes to be tested to be engaged in a fluid tight manner each between one testing head on the stationary supporting frame and the aligned testing head on the testing head carriage, means for admitting fluid under pressure to all the tubes so engaged via the testing heads of the stationary supporting frame, the means for longitudinally displacing and holding the testing head carriage relatively to the longitudinally displaceable frame including toggle lever means engaging at one end said carriage and at the other end said longitudinally displaceable frame, electro-magnet means operably coupled with said toggle lever means for controlling the straightening and buckling thereof, further comprising: hydraulic cylinders mounted in said stationary supporting frame, one for each testing head therein, longitudinally bored pistons slidable in said hydraulic cylinders, said testing heads being individually secured to said pistons, means for admitting pressure liquid to said hydraulic cylinders to displace said pistons and thus said testing heads, the rear end of each piston extending out of the rear end of its associated cylinder, a second set of cylinders behind said stationary supporting frame, the rear ends of said longitudinally bored pistons extending as sword tubes into these latter cylinders and means for admitting pressure fluid to said latter cylinders so that the pressure fluid to be admitted to the interior of the tubes that are being tested is supplied through such latter cylinders and through the bores of said pistons.

9. A tube-testing machine as claimed in claim 8, and further comprising a cross-head secured to the rear end of each of said sword tubes, a pair of hydraulic cylinders arranged parallel to the cylinders of said second set and located behind said stationary supporting frame, a pair of retracting pistons slidable in said last-mentioned cylinders, and means for admitting pressure liquid to said last-mentioned cylinders.

10. A tube-testing machine as claimed in claim 8, and further comprising a hydraulic cylinder located in the stationary supporting frame alongside each piston carrying a testing head, and a sword tube slidable in such cylinder for supplying liquid under pressure into each test head.

11. A tube testing machine comprising a stationary supporting frame, longitudinally extending supporting rails and longitudinally extending tie rods carried by said supporting frame and connected thereto at one of their respective ends with the tie rods mounted in parallelism above the rails, a longitudinally displaceable frame including means for movably supporting the same on said rails, means for securing said longitudinally displaceable frame to said tie rods at selected opposite locations along said tie rods so as to hold said longitudinally displaceable frame at selected positions to enable the same to resist axial forces, a longitudinally displaceable testing head carriage including means for movably supporting the same on said rails, said carriage being disposed between said longitudinally displaceable frame and said stationary supporting frame, a plurality of testing heads mounted on said stationary supporting frame for independent displacement toward and away from said testing head carriage, an equal plurality of testing heads carried by the testing head carriage in alignment with said first-mentioned testing heads so as to enable tubes to be tested to be engaged in a fluid tight manner each between a testing head on the stationary supporting frame and the aligned testing head on the testing head carriage, means for admitting fluid under pressure to the testing heads of the stationary supporting frame for entry into the tubes to be tested, means for longitudinally displacing said testing head carriage toward and away from said stationary supporting frame and said longitudinally displaceable frame including toggle lever mechanism connected at one end to said carriage and at the other end to said longitudinally displaceable frame and electromagnet means carried by said longitudinally displaceable frame and connected to said toggle lever mechanism for controlling the straightening and buckling thereof so as to move the testing head carriage toward and away from the stationary frame and thus simultaneously move all the testing heads of the testing head carriage relative to the independently movable testing heads on said stationary supporting frame.

References Cited in the file of this patent

UNITED STATES PATENTS

| | | |
|---|---|---|
| 2,017,393 | Boax et al. | Oct. 15, 1935 |
| 2,497,193 | Webb | Feb. 14, 1950 |
| 2,617,292 | Grau | Nov. 11, 1952 |
| 2,679,748 | Kent et al. | June 1, 1954 |
| 2,885,886 | Carrie | May 12, 1959 |
| 2,896,445 | McNabb | July 28, 1959 |

FOREIGN PATENTS

| | | |
|---|---|---|
| 401,621 | Great Britain | Nov. 16, 1933 |